United States Patent [19]

Nyström et al.

[11] Patent Number: 5,302,060
[45] Date of Patent: Apr. 12, 1994

[54] DRILLING TOOL AND INSERT THEREFOR

[75] Inventors: Leif R. Nyström, Järbo; Claes G. Lagerholm, Sandviken, both of Sweden; Anthony F. Yakamavich, Jr., Glenwood, N.J.

[73] Assignee: Sandvik AB, Sandviken, Sweden

[21] Appl. No.: 808,748

[22] Filed: Dec. 17, 1991

[30] Foreign Application Priority Data

Dec. 19, 1990 [SE] Sweden .......................... 9004061-9

[51] Int. Cl.⁵ .................................... B23B 51/00
[52] U.S. Cl. .................................... 408/224; 407/116; 408/227; 408/231
[58] Field of Search .................... 407/114–116, 407/34; 408/227, 231, 233, 224, 713, 83, 40–42, 223

[56] References Cited

U.S. PATENT DOCUMENTS

| | | |
|---|---|---|
| 3,540,323 | 11/1970 | Rishel . |
| 3,815,191 | 6/1974 | Holma .................... 407/114 |
| 3,887,974 | 6/1975 | Sorice . |
| 3,942,229 | 3/1976 | Takeyama et al. . |
| 3,947,937 | 4/1976 | Hertel .................... 407/114 |
| 3,963,365 | 6/1976 | Shallenberger, Jr. ........ 408/186 |
| 4,131,383 | 12/1978 | Powers .................... 407/114 |
| 4,215,957 | 8/1980 | Holma et al. .............. 407/114 |
| 4,844,643 | 7/1989 | Icks ....................... 407/42 |

FOREIGN PATENT DOCUMENTS

| | | |
|---|---|---|
| 41224/78 | 7/1982 | Australia . |
| 2617455 | 3/1977 | Fed. Rep. of Germany . |
| 3802290 | 6/1989 | Fed. Rep. of Germany . |
| 1491651 | 11/1977 | United Kingdom . |

*Primary Examiner*—Steven C. Bishop
*Attorney, Agent, or Firm*—Burns, Doane, Swecker & Mathis

[57] ABSTRACT

A cutting insert includes a cutting edge extending obliquely relative to a center line of the insert. A chip breaking recess is spaced inwardly from the cutting edge and extends parallel hereto. A drill tool contains three inserts situated along a common diameter. The center insert has a cutting edge radially overlapping the cutting edges of the other two inserts. Each of the cutting edges of the other two inserts extends axially rearwardly and radially outwardly.

23 Claims, 3 Drawing Sheets

DRILLING TOOL AND INSERT THEREFOR

BACKGROUND OF THE INVENTION

The present invention relates to a cutting insert for chipforming machining of metallic workpieces comprising at least one cutting corner and an adjacent cutting edge provided at the intersection between an upper rake face and a lower clearance face on the insert, the rake face being provided with a chip breaking recess. The invention also relates to a drilling tool equipped with such an insert.

Prior art drilling tools, including a drill shaft equipped with inserts having one or several sintered-in chip breaking grooves in the rake face are disclosed for instance in U.S. Pat. No. 4,215,957. Such drilling tools, however, cannot always provide a desirable optimum formation of the chip. It is often desirable to be able to obtain very short comma-shaped chips, thus making it possible to increase the efficiency of chip discharge. At the same time, however, a reduction of the energy needed for powering the drill has not been achievable.

It is, therefore, an object of this invention to provide a novel insert and a drilling tool that enables a more favorable chip formation when drilling occurs in tough materials and materials of medium tough conditions.

It is another purpose of the invention to provide a new type of insert and a drilling tool that enables a reduction of the power energy needed for its operation.

SUMMARY OF THE INVENTION

The present invention involves a cutting insert, and a rotary drill in which the insert can be used for chipforming machining of bores in metal workpieces.

The cutting insert includes upper and lower portions. The upper portion includes a top surface and a rake face spaced from the top surface in a direction toward the lower portion. Edge faces extend between the rake face and the lower portion. An intersection between the rake face and a first of the edge faces defines a cutting edge. The first edge face defines a clearance face for the cutting edge. The cutting edge extends obliquely relative to a center line of the insert. The center line intersects the first edge face and a second edge face disposed opposite the first edge face as the insert is viewed in top plan. The rake face includes a chip breaking recess extending parallel to the cutting edge and spaced inwardly therefrom as the insert is viewed in top plan.

Preferably, a smoothly curved transition surface extends from an inner end of the recess to the top surface. That transition surface is shaped as a circular arc in cross-section. The arc has a radius which is greater than a height extending between the top surface and a portion of the rake face defining a cutting edge.

The edge faces include third and fourth mutually parallel edge faces each extending between the first and second edge faces. At least a portion of the second edge face extends perpendicular to the third and fourth edge faces. The cutting edge forms an acute angle with a normal to the third and fourth edge faces as the insert is viewed in top plan. That acute angle is from 10 to 45 degrees, and most preferably from 10 to 25 degrees.

The chip breaker recess is preferably shaped as a circular arc in cross section. A radius of that circular arc is smaller than a width of the recess as measured between outer and inner ends of the recess. The radius of the recess is smaller than the radius of the transition surface.

The drilling tool comprises a drill body having at least one guide pad on an outer cylindrical peripheral surface thereof. At least first and second cutting inserts are oriented generally along the same diameter of the drill body. The first insert is located closer to a center axis of rotation of the drill body than the second insert. The second insert is situated at the peripheral surface and has a cutting edge extending radially and axially inwardly. The cutting edge forms an acute angle with a line normal to the line of rotation. That acute angle is from 10 to 45 degrees. The insert includes a chip breaking recess extending parallel to the cutting edge and spaced therefrom in a direction axially rearwardly.

Preferably, the first insert also includes a cutting edge extending radially outwardly and axially rearwardly and forming an acute angle of 10 to 45 degrees with a line normal to the axis of rotation.

Preferably, a third cutting insert is disposed diametrically intermediate the first and second inserts and along the same diameter. The third insert has a cutting edge extending radially inwardly and axially rearwardly. A radially inner edge of the cutting edge of the third insert is disposed adjacent the axis of rotation.

The cutting edge of the third insert preferably radially overlaps the cutting edges of the other two inserts.

BRIEF DESCRIPTION OF THE DRAWINGS

The objects and advantages of the invention will become apparent from the following detailed description of preferred embodiments thereof in connection with the accompanying drawings in which like numerals designate like elements, and in which.

DETAILED DESCRIPTION OF PREFERRED EMBODIMENTS OF THE INVENTION

Figure 1:
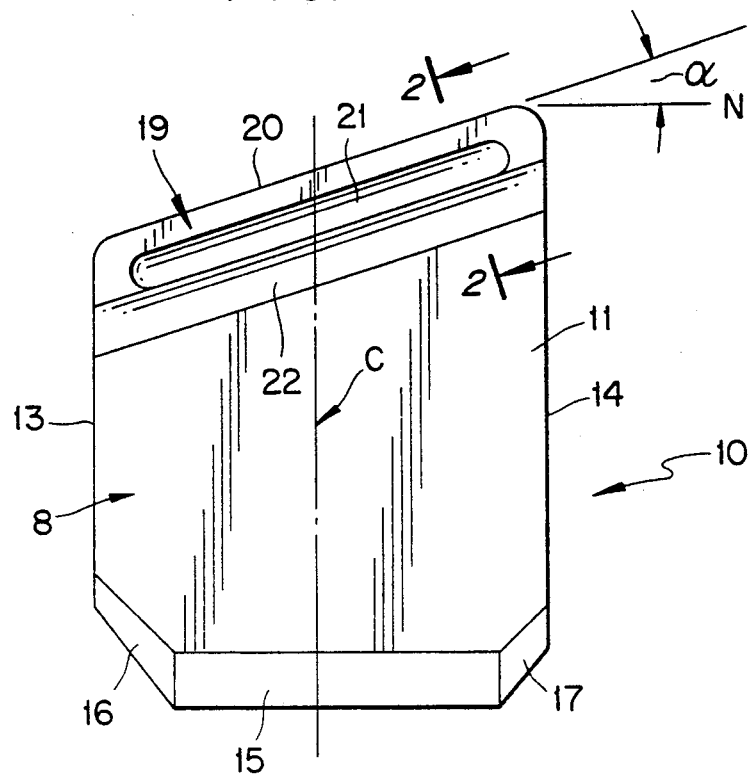
FIG. 1 is a top perspective view of an insert according to the invention.
Figure 2:
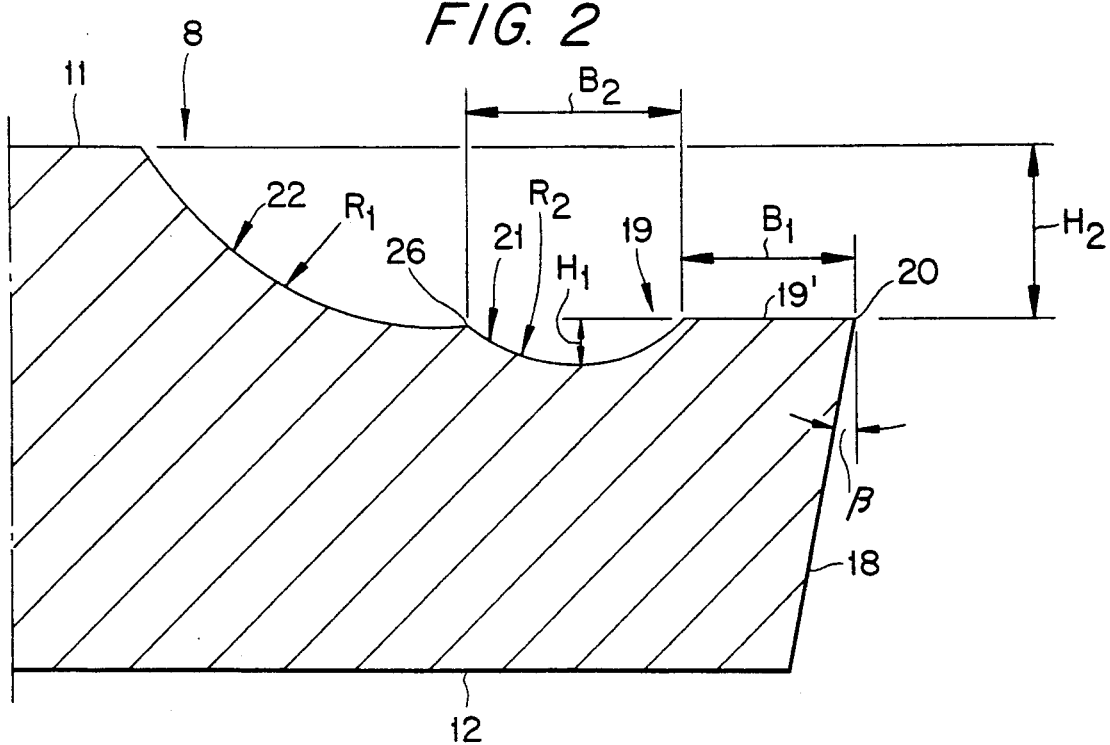
FIG. 2 is a sectional view taken along the line 2—2 in FIG. 1.

An insert 10 depicted in FIGS. 1 and 2 comprises upper and lower portions 8, 12. The upper portion includes a planar top surface 11 disposed parallel to the planar lower portion 12. The top and bottom portions are interconnected by four edge faces, two of which 13, 14 are planar, parallel and opposite one another. Another of the edge faces is constituted by three surface portions 15, 16 and 17, of which the surface portion 15 is oriented perpendicularly in relation to the edge faces 13 and 14. A center line C of the insert intersects a fourth edge face 18 and the surface portion 15. The fourth edge face 18 of the insert is oriented at an acute angle $\alpha$ of 10°–45°, preferably 10°–25° in relation to a line which is normal to the center line C. In the embodiment disclosed in FIGS. 1–2, that center line C is parallel to the edge faces 13, 14. The edge surface 18 is also provided with a certain clearance angle $\beta$ relative to an upper rake face 19 of the upper portion 8, whereby the intersection of a flat portion 19' of the rake face 19 with the edge face 18 forms a cutting edge 20.

A chip breaking recess 21 is provided in the rake face 19. That recess extends parallel to the cutting edge 20 while located at a certain distance therefrom. The recess 21 extends along the major portion of the length of the edge 20 and terminates at a certain distance from edge faces 13 and 14. The flat portion 19' of the rake face 19 lies in a plane situated at a lower elevation than the top surface 11 and is parallel therewith. A transition surface 22 extending between the surface 11 and an inner end 26 of the recess 21 is a concave surface having a radius $R_1$. It is found suitable to provide the recess 21 with a depth $H_1$ from the flat portion of the rake face, which depth amounts to about one fourth of the width $B_1$ of the flat portion 19'.

Figure 3:
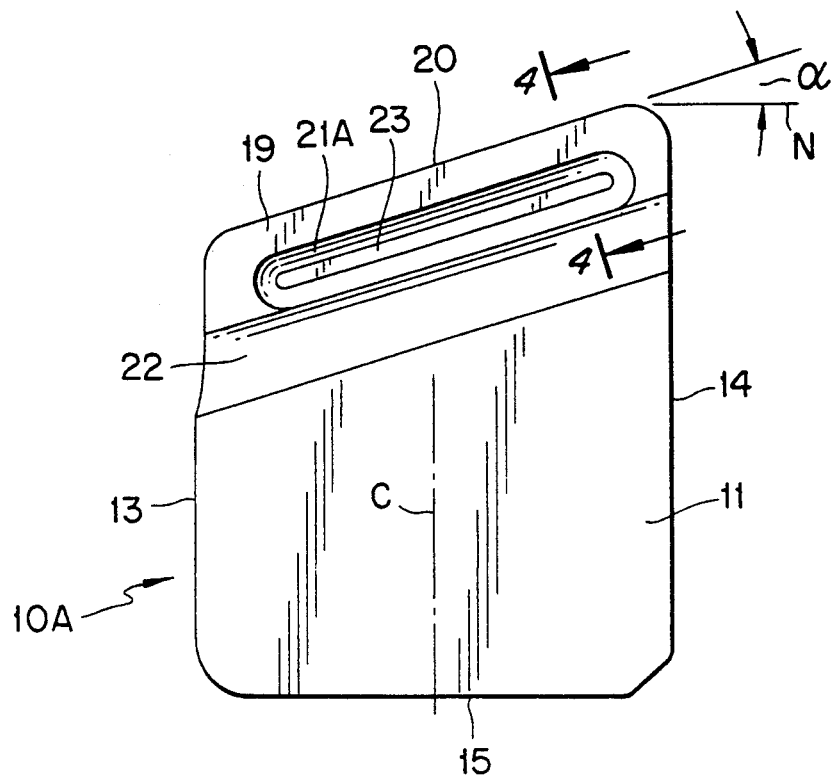
FIG. 3 is a top plan view of an insert according to an alternative embodiment of the invention.
Figure 4:
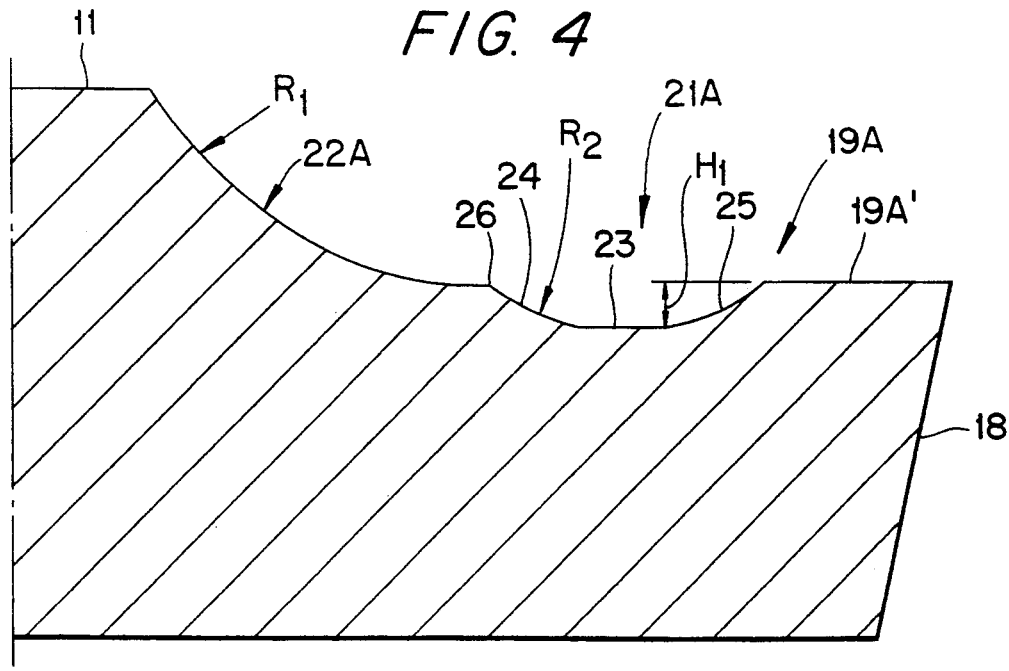
FIG. 4 is a sectional view taken along the line 4—4 in FIG. 3.

In FIGS. 3-4 there is shown another embodiment of the insert 10A in which the chip breaking recess 21A is located at a greater distance from the cutting edge 20. A cross section through the recess 21A reveals that the recess 21A includes a planar bottom center surface portion 23 lying in a plane parallel with the top surface 11, and concave surface portions 24, 25 extending from opposite sides of the flat bottom portion 23. In similarity with the insert disclosed in FIGS. 1-2, the transition between the top surface 11 and the recess 21A is provided by a surface 22A which is concave in cross-section. The radius $R_1$ of the surface 22A preferably is about double the radius $R_2$ of each of the surface portions 24, 25.

It is preferable that $R_1$ is about double the length of the height $H_2$ between the flat portion 19A' of the rake face 19A and the top surface in FIGS. 2 and 4. The radius $R_1$ should preferably be equal to the sum of $B_1 + B_2$ where $B_1$ represents the width of the flat portion of the rake face 19A, and $B_2$ represents the width of the recess 21 (or 21A). $B_2$ is preferably larger than radius $R_2$.

Figure 5:
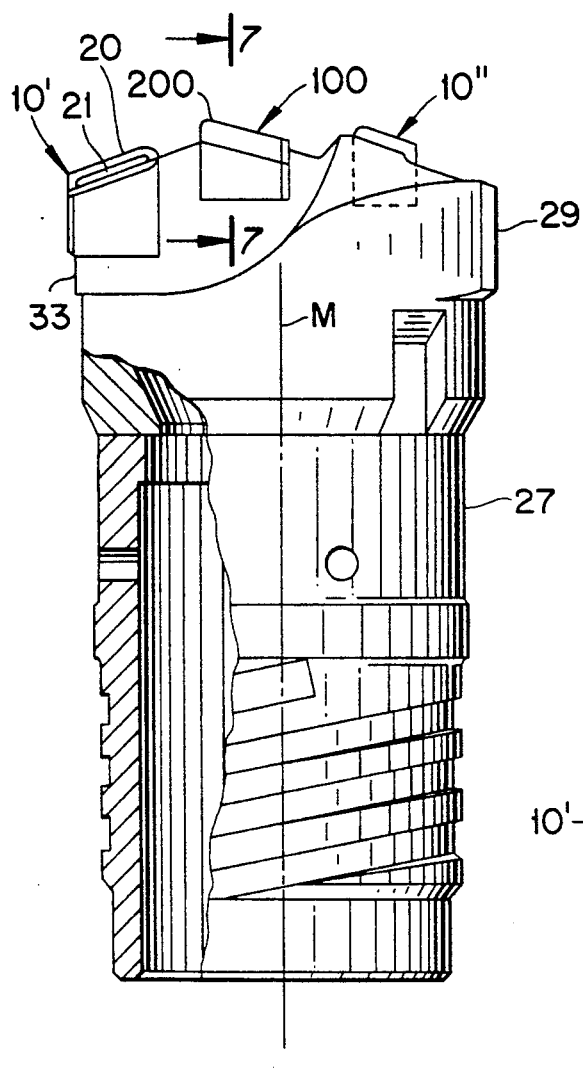
FIG. 5 is a side view of a drill body equipped with cutting inserts according to the invention.
Figure 6:
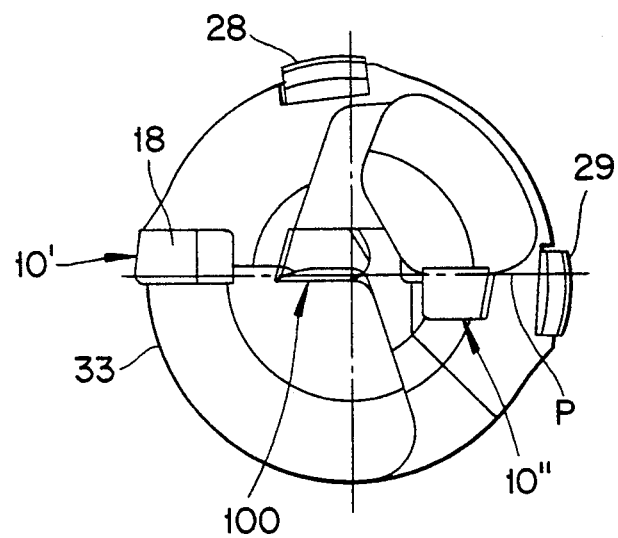
FIG. 6 is a front end view of the drill shown in FIG. 5.
Figure 7:
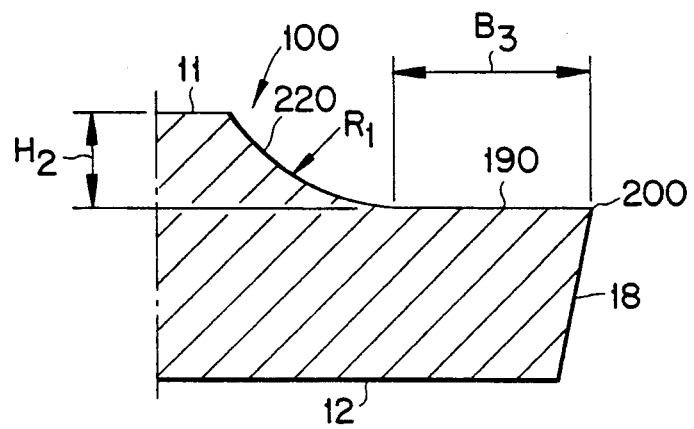
FIG. 7 is a sectional view taken along the line 7—7 in FIG. 5.

In FIGS. 5-7 there is shown a drill tool containing three inserts 10', 10'', 100. The drill tool includes a drill body 27, the front portion of which is provided with two guide pads 28, 29 and the three radially oriented cutting inserts 10', 10'', 100. The inserts are brazed to the drill body and have their cutting edges oriented in a common diametrical plane P. The inserts 10', 10'' are identical to the insert 10 (or 10A) described earlier in connection with FIGS. 1, 2 (or 3, 4), whereas the insert 100 is configured as depicted in FIG. 7 (to be hereinafter described). The inserts 10', 10'' are located on opposite sides of an axial center line M of the drill tool, and the insert 100 is located radially therebetween. The radially outermost peripheral insert 10' extends radially beyond the cylindrical circumferential surface 33 of the drill body as well as beyond the guide pads 28, 29 so that the diameter of the hole in the workpiece penetrated by the drill is defined by the insert 10'. The inserts 10', 100 are both located on one side of the axial center line M, whereby the cutting edge 200 of insert 31 is inclined axially rearwardly and radially inwardly. Both of inserts 10', 100 could be located entirely on the same side of center line M, or insert 100 could slightly overlap the line M, as shown in FIG. 5.

The insert 100 (FIG. 7) is shaped generally similarly to the insert 10 shown in FIGS. 1-2. The cutting edge 200 provided between rake face 190 and clearance face 18 is similar to cutting edge 20 of insert 10 in that it extends at an angle $\alpha$ from a normal N to the parallel edge faces. The rake face 190 of insert 110 is a flat surface located at a height $H_2$ below surface 11. The insert 100 does not contain a chip breaker recess; rather the rake face 190 directly joins the concave surface 22. The width $B_3$ of the rake face thus corresponds to the sum of widths $B_1 + B_2$ of the insert 10 shown in FIGS. 1-2, and the transition between top face 11 and the rake face 190 is defined by the concave surface 220 defined by radius $R_1$.

The insert 10'' and the guide pad 29 are located on the same side of the center line M, with the insert 10'' located between the drill rotation center and the guide pad 29. As best appears from FIG. 5, the inserts 100 and 10'' are located in approximately the same axially advanced position and are axially advanced as compared with the peripheral insert 10'. Further, it is to be understood that during rotation of the tool body, the insert 10'' radially overlaps both of the other inserts 100, 10', whereby the three inserts cut out the entire diameter of the hole to be drilled.

By arranging the inserts with such radial overlap on both sides of the center line M and by arranging inserts 100 and 10'' in axially advanced positions relative to insert 10', a reduction of the total main cutting force or resultant force is obtained. By additionally providing two inserts 10', 10'' shaped as described in connection with FIGS. 1-2 (or FIGS. 3-4), in combination with an insert 100 shaped as described in connection with FIG. 7, it has been found that not only are the cutting forces reduced, but also the amount of wear on the cutting edge can be reduced since the contact length, i.e., the amount of surface abutment between chip and insert, is reduced. It is important that inserts 10' and 10'' have the same shape, with the cutting edges 20 of both of inserts 10' and 10'' being inclined axially inwardly and radially outwardly.

The center line C of each insert is oriented substantially parallel to the center axis M of the drill body. Therefore, the afore-mentioned angle $\alpha$ can be considered as being formed by the cutting edge 20 (or 200) with a normal to the center axis of rotation M of the drill body. Tests have shown that it is possible to reduce the contact length between chip and insert up to 60%. This is of great importance, especially for the peripheral insert 10' which is subjected to a maximum rotary cutting speed (note: the cutting speed is reduced when approaching the center of the drill, and is zero at the center).

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A cutting insert for use in a rotary drill for chip-forming machining of bores in metal workpieces, comprising:
   upper and lower portions,
      said upper portion including a top surface and a rake face spaced from said top surface in a direction toward said lower portion, and
   edges faces extending between said rake face and said lower portion, an intersection between said rake face and a first of said edge faces defining a cutting edge, with said first edge face defining a clearance face for said cutting edge, said cutting edge extending obliquely relative to the center line of said insert, said center line intersecting said first edge face and a second edge face disposed opposite said first edge face as said insert is viewed in top plan, said edge faces including third and fourth mutually parallel edge faces each extending between said first and second edge faces, at least a portion of said second edge face extending perpendicular to said third and fourth edge faces, said rake face including a chip breaking recess extending parallel to said cutting edge and spaced inwardly therefrom as said insert is viewed in top plan.

2. A cutting insert according to claim 1 including a smoothly curved transition surface extending from an inner end of said recess to said top surface.

3. A cutting insert according to claim 2, wherein said transition surface is shaped as a circular arc in cross section, said arc having a radius which is greater than a height extending between said top surface and a portion of said rake face defining said cutting edge.

4. A cutting insert according to claim 3, wherein said radius is about twice as great as said height.

5. A cutting insert according to claim 1, wherein said cutting edge forms an acute angle with a normal to said third and fourth edge faces as said insert is viewed in top plan, said acute angle being from 10 to 45 degrees.

6. A cutting insert according to claim 5, wherein said acute angle is from 10 to 25 degrees.

7. A cutting insert according to claim 1, wherein said chip breaker recess is shaped as a circular arc as viewed in cross section, a radius of said circular arc being smaller than a width of said recess measured between outer and inner ends of said recess.

8. A cutting insert according to claim 7, including a transition surface extending from said inner end of said recess to said top surface, said transition surface being shaped as a circular arc in cross section and having a radius which is greater than said radius of said recess.

9. A cutting insert according to claim 8, wherein said radius of said transition surface is about two times as great as said radius of said recess.

10. A cutting insert according to claim 9, wherein said second radius is approximately equal to a distance from said cutting edge to an inner end of said recess.

11. A cutting insert for use in a rotary drill for chip-forming machining of bores in workpieces, comprising:
upper and lower portions,
said upper portion including a top surface, a rake face spaced from said top surface in a direction toward said lower portion, and a smoothly curved transition surface extending from said top surface to said rake face,
edge faces extending between said rake face and said lower portion, an intersection between said rake face and a first of said edge faces defining a cutting edge, with said first edge face defining a clearance face for said cutting edge,
said cutting edge extending obliquely relative to a center line of said insert, said center line intersecting said first edge face and a second edge face disposed opposite said first edge face as said insert is viewed in top plan,
third and fourth ones of said edge faces being mutually parallel and each extending between said first and second edge faces,
at least a portion of said second edge face extending perpendicular to said third and fourth edge faces,
said rake face including a chip breaking recess extending parallel to said cutting edge and spaced inwardly therefrom as said insert is viewed in top plan, said recess being shaped in cross section as a circular arc having a first radius, said first radius being smaller than a width of said recess measured between inner and outer ends thereof,
said transition surface extending from an inner end of said recess to said top surface and being shaped in cross section as a circular arc having a second radius which is greater than said first radius, and greater than a height extending between said top surface and a portion of said rake face defining said cutting edge.

12. A drilling tool comprising a drill body having at least one guide pad on an outer cylindrical peripheral surface thereof, at least first and second cutting inserts oriented generally along the same diameter of said drill body, said first insert being located closer to a center axis of rotation of said drill body than said second insert, said second insert having a cutting edge extending radially outwardly and axially inwardly, said cutting edge forming an acute angle with a line normal to said axis of rotation, said acute angle being from 10 to 45 degrees, said insert including a chip breaking recess extending parallel to said cutting edge and spaced therefrom in a direction axially rearwardly.

13. A drill tool according to claim 12, wherein said acute angle is from 10 to 25 degrees.

14. A drill tool according to claim 12, wherein said first insert includes a cutting edge extending radially outwardly and axially rearwardly and forming an acute angle of 10–45 degrees with a line normal to said axis of rotation.

15. A drill tool according to claim 14 including a third cutting insert disposed diametrically intermediate said first and second inserts and lying along said same diameter, said third insert having a cutting edge extending radially inwardly and axially rearwardly, a radially inner edge of said cutting edge of said third insert being disposed adjacent said axis of rotation.

16. A drill tool according to claim 15, wherein said cutting edge of said third insert overlaps said axis of rotation.

17. A drill tool according to claim 13 including a third cutting insert located substantially along said same diameter and situated diametrically intermediate said first and second inserts, said third cutting edge having a cutting edge which radially overlaps cutting edges of said first and second inserts, said first and second inserts being situated on opposite sides of said axis of rotation.

18. A drill tool according to claim 17, wherein said second insert is located axially forwardly of said first insert.

19. A drill tool according to claim 17, wherein said first and second inserts are of identical configuration.

20. A drill tool according to claim 17, wherein said first insert is spaced radially outwardly from said axis of rotation.

21. A drill tool according to claim 14, wherein said second and third inserts are located axially forwardly of said first insert by substantially the same distance, said third insert including a rake face which is flat from its cutting edge to a smoothly curved transition surface.

22. A cutting insert for use in a rotary drill for chip-forming machining of bores in metal workpieces, comprising:
  upper and lower portions,
    said upper portion including a top surface and a rake face spaced from said top surface in a direction toward said lower portion.
  edge faces extending between said rake face and said lower portion, an intersection between said rake face and a first of said edge faces defining a cutting edge, which said first edge face defining a clearance face for said cutting edge,
  said cutting edge extending obliquely relative to a center line of said insert, said center line intersecting said first edge face and a second edge face disposed opposite said first edge face as said insert is viewed in top plan,
  said rake face including a chip breaking recess extending parallel to said cutting edge and spaced inwardly therefrom as said insert is viewed in top plan, and
  a smoothly curved transition surface extending from an inner end of said recess to said top surface.

23. A cutting insert for use in a rotary drill for chip-forming machining of bores in metal workpieces, comprising:
  upper and lower portions,
    said upper portion including a top surface and a rake face spaced from said top surface in a direction toward said lower portion, and
  edge faces extending between said rake face and said lower portion, an intersection between said rake face and a first of said edge faces defining a cutting edge, with said first edge face defining a clearance face of said cutting edge,
  said cutting edge extending obliquely relative to a center line of said insert, said center line intersecting said first edge face and a second edge face disposed opposite said first edge face sa said insert is viewed in top plan,
  said rake face including ac hip breaking recess extending parallel to said cutting edge and spaced inwardly therefrom as said insert is viewed in top plan, said chip breaker recess being shaped as a circular arc as viewed in cross section, a radius of said circular arc being smaller than a width of said recess measured between outer and inner ends of said recess.

* * * * *